(12) United States Patent
Krueger et al.

(10) Patent No.: US 9,227,179 B2
(45) Date of Patent: Jan. 5, 2016

(54) SELENIUM-CONTAINING HYDROPROCESSING CATALYST, ITS USE, AND METHOD OF PREPARATION

(71) Applicant: SHELL OIL COMPANY, Houston, TX (US)

(72) Inventors: Karl Marvin Krueger, Houston, TX (US); Puneet Gupta, Houston, TX (US)

(73) Assignee: Shell Oil Company, Houston, TX (US)

( * ) Notice: Subject to any disclaimer, the term of this patent is extended or adjusted under 35 U.S.C. 154(b) by 332 days.

(21) Appl. No.: 13/849,829

(22) Filed: Mar. 25, 2013

(65) Prior Publication Data

US 2013/0256195 A1  Oct. 3, 2013

Related U.S. Application Data

(60) Provisional application No. 61/616,184, filed on Mar. 27, 2012.

(51) Int. Cl.
| | |
|---|---|
| *B01J 27/057* | (2006.01) |
| *B01J 27/19* | (2006.01) |
| *B01J 23/85* | (2006.01) |
| *B01J 23/882* | (2006.01) |
| *B01J 23/883* | (2006.01) |
| *B01J 23/888* | (2006.01) |
| *B01J 27/188* | (2006.01) |
| *B01J 37/02* | (2006.01) |
| *C10G 45/08* | (2006.01) |
| *B01J 27/02* | (2006.01) |

(52) U.S. Cl.
CPC *B01J 27/19* (2013.01); *B01J 23/85* (2013.01); *B01J 23/882* (2013.01); *B01J 23/883* (2013.01); *B01J 23/888* (2013.01); *B01J 27/0573* (2013.01); *B01J 27/188* (2013.01); *B01J 37/0201* (2013.01); *B01J 37/0207* (2013.01); *C10G 45/08* (2013.01)

(58) Field of Classification Search
CPC ....... B01J 27/02; B01J 27/057; B01J 27/0573
See application file for complete search history.

(56) References Cited

U.S. PATENT DOCUMENTS

| | | | | |
|---|---|---|---|---|
| 2,851,399 | A | * | 9/1958 | Brennan et al. ............... 208/138 |
| 4,213,881 | A | * | 7/1980 | Eberly, Jr. .................... 502/215 |
| 2009/0139904 | A1 | | 6/2009 | Eijsbouts-Spickova et al. |

* cited by examiner

*Primary Examiner* — Brian McCaig
(74) *Attorney, Agent, or Firm* — Charles W. Stewart

(57) ABSTRACT

A hydroprocessing catalyst composition that comprises a support material and a selenium component and which support material further includes at least one hydrogenation metal component. The hydroprocessing catalyst is prepared by incorporating a selenium component into a support particle and, after calcination thereof, incorporating at least one hydrogenation metal component into the selenium-containing support. The metal-incorporated, selenium-containing support is calcined to provide the hydroprocessing catalyst composition.

10 Claims, 1 Drawing Sheet

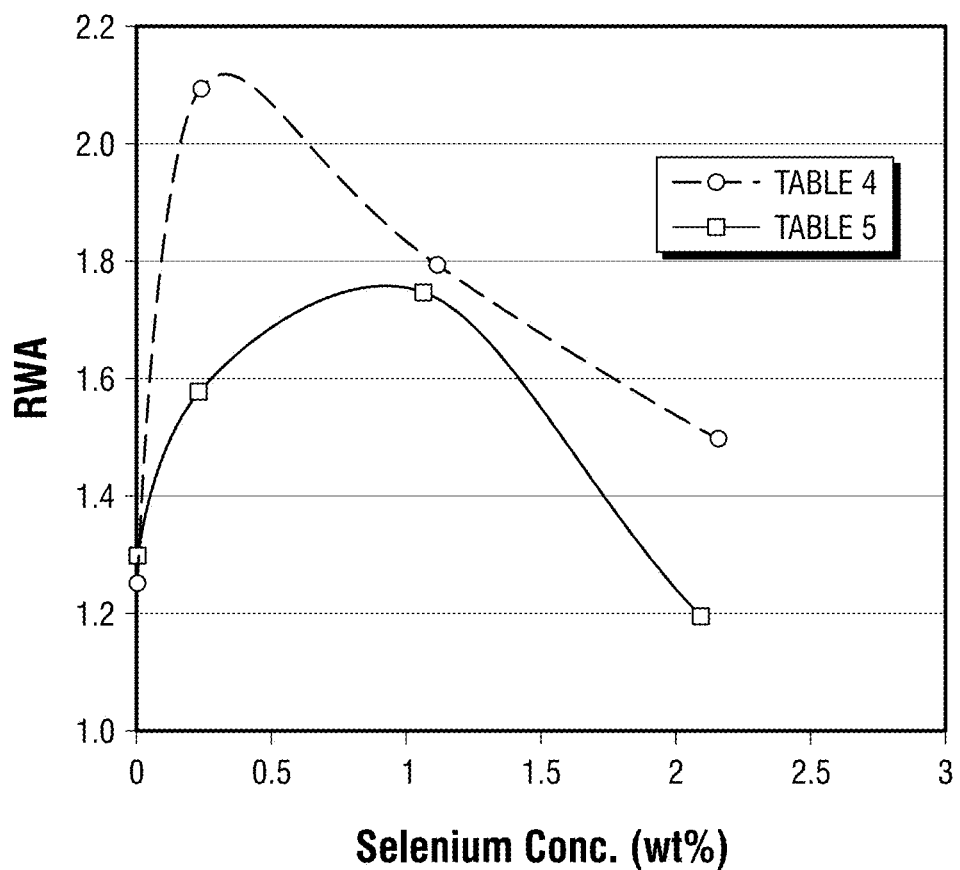

SELENIUM-CONTAINING HYDROPROCESSING CATALYST, ITS USE, AND METHOD OF PREPARATION

This application claims the benefit of U.S. Provisional Application No. 61/616,184, filed Mar. 27, 2012, which is incorporated herein by reference.

The invention relates to a selenium-containing hydroprocessing catalyst composition, a method of making such composition, and the use of the composition in the hydroprocessing of hydrocarbon feedstocks.

In the catalytic hydroprocessing of hydrocarbon feedstocks catalyst compositions containing hydrogenation metals are used to promote desulfurization and denitrogenation reactions to provide for the removal of organic sulfur and organic nitrogen compounds from the hydrocarbon feedstocks. The reactions are accomplished by contacting catalyst particles with a hydrocarbon feedstock under conditions of elevated temperature and pressure and in the presence of hydrogen so that the sulfur components of the feedstock are converted to hydrogen sulfide and the nitrogen components of the feedstock are converted to ammonia. The hydrogen sulfide and ammonia may then be removed from the treated hydrocarbon to give a hydrotreated product.

Typical hydroprocessing catalysts contain one or more hydrogenation metals supported on a porous refractory oxide support material. The hydrogenation metal is usually selected from metals of Group VIII of the periodic table, such as nickel and cobalt, and Group VI of the periodic table, such as molybdenum and tungsten. The porous refractory oxide support material can typically be alumina. Promoters such as phosphorous may also be used as a component of the hydroprocessing catalyst.

The prior art discloses many types of hydroprocessing catalysts and processes. One example of a prior art catalyst is disclosed in U.S. Pat. No. 5,389,595. In this patent, a catalyst is presented that contains an overlayer of a catalytic promoter, such as a Group VIB metal, on a porous refractory support that contains an underbedded Group VIII metal containing component. The catalyst may also contain additional catalytic promoter materials that include phosphorus, titanium, zirconium, hafnium, vanadium, manganese, magnesium, calcium, lanthanum, copper, Group VIB metals, and Group VIII metals. The catalyst typically contains greater than 4.0 weight percent of Group VIII metal component (calculated as the monoxide) and greater 10 weight percent of Group VIB metal component (calculated as the trioxide). The phosphorus component is typically present in the catalyst from about 0.5 to about 15 weight percent (calculated as P). The '595 patent does not disclose the use of selenium as a component of its catalyst composition nor does it disclose a catalyst composition having an underbedded selenium component. There also is no indication that selenium may be used to improve the performance of hydroprocessing catalysts.

Another example of a hydroprocessing catalyst is disclosed in U.S. Pat. No. 7,871,513. The catalyst presented in this patent is a calcined mixture made by calcining a formed particle of a mixture comprising molybdenum trioxide, a nickel compound, and an inorganic oxide material. The mixture may have less than 2 weight percent of a molybdenum compound other than molybdenum trioxide, an amount of molybdenum trioxide so as to provide a molybdenum content in the calcined mixture in the range upwardly to 12 weight percent, and an amount of nickel compound so as to provide a nickel content in the calcined mixture that is in the range upwardly to 4 weight percent. The '513 patent does not disclose the use of selenium as a component of its catalyst composition nor does it disclose a catalyst composition having an underbedded selenium component. There is no indication presented in the '513 patent that selenium may be used to improve the performance of hydroprocessing catalysts.

It is an important and continuing aim of the industry to discover and develop hydroprocessing catalysts of improved activity. Catalysts of improved activity allow for the operation of hydrotreating reactors under milder process conditions resulting in lower energy requirements to yield the desired products and longer catalyst life due to lower coke formation.

Accordingly, provided is the inventive hydroprocessing catalyst that comprises a support particle comprising an inorganic refractory oxide and a selenium component. The support particle further has incorporated in it at least one hydrogenation metal component.

Another invention is directed to a method of making a hydroprocessing catalyst by preparing a support comprising an inorganic refractory oxide and incorporating a selenium component into the support particle to provide a selenium-containing support. The selenium-containing support is calcined to provide a calcined selenium-containing support into which a hydrogenation metal is incorporated to provide a metal-incorporated, selenium-containing support that is further calcined to provide the hydroprocessing catalyst.

The inventive hydroprocessing catalyst or an hydroprocessing catalyst prepared by the inventive method of making such a catalyst may be used in a hydrotreating process that comprises contacting under hydrotreating process conditions a hydrocarbon feedstock with the hydroprocessing catalyst.

A method is also presented that provides for the improvement in certain of the catalytic properties of a hydroprocessing catalyst including an inorganic refractory oxide support and at least one hydrogenation metal component, wherein the method comprises: incorporating a selenium component into the inorganic refractory oxide support.

FIG. 1 presents a plot of the relative weight activity of a number of catalyst compositions as a function of the weight percent selenium that is contained in each respective catalyst.

A novel catalyst composition has been discovered that exhibits enhanced hydrodesulfurization activity over other prior art compositions. It further is found that significant improvements are achieved in the catalytic activity of a hydroprocessing catalyst by the incorporation or introduction of a selenium component into its support material.

The catalyst composition of the invention, in general, comprises a support material, a selenium component and at least one hydrogenation metal component. The support material used in the preparation of the inventive catalyst composition may be selected from a group of porous inorganic refractory oxide materials that can suitably provide a support for the metal hydrogenation components of the catalyst composition of the invention.

Examples of possible suitable porous refractory oxides that may be used include silica, alumina, titania, zirconia, silica-alumina, silica-titania, silica-zirconia, titania-alumina, titania-zirconia, zirconia-alumina, and combinations of two or more thereof. The preferred porous refractory oxide for use in the preparation of the support material of the composition of the invention is one selected from the group consisting of alumina, silica, and silica-alumina. Among these, the more preferred porous refractory oxide is alumina. A particularly preferred alumina support material is wide pore alumina.

The porous refractory oxide generally may have an average pore diameter in the range of from about 50 Angstroms (Å) to about 350 Angstroms (Å) with a significant portion of the pores having pore diameters in the range of from 100 Å to 350 Å. The total pore volume of the porous refractory oxide as measured by standard mercury porosimetry methods is in the range of from about 0.2 cc/gram to about 2 cc/gram. The surface area of the porous refractory oxide, as measured by the B.E.T. method, generally exceeds about 100 m²/gram, and it is typically in the range of from about 100 to about 400 m²/gram.

In the preparation of the inventive composition, the selenium compound or component typically can be combined with the support material by any suitable means or method so as to provide a support particle comprising the support material and the selenium component. Thus, the selenium component may be comulled with the support material during the preparation of a mixture that is formed or shaped into support particles of the composition, or the selenium component may be incorporated by any suitable means or method into an already formed or shaped inorganic refractory oxide support particle. An example of a suitable method for incorporating the selenium component into the support particle is by any pore volume impregnation known to those skilled in the art. As is discussed herein, the incorporation of the selenium component into the support material of a hydroprocessing catalyst can provide for a hydroprocessing catalyst, including an inorganic refractory oxide support and at least one hydrogenation metal component, having certain enhanced catalytic properties.

Any suitable selenium containing compound capable of providing for the inventive composition having desired properties may be used in its preparation. Examples of possible suitable selenium compounds that may be incorporated into or mixed with the support material include selenate compounds, such as selenate salts, e.g., selenic acid ($H_2SeO_4$), and selenite compounds, such as selenite salts, e.g., selenous acid ($H_2SeO_3$). Other possible selenium compounds include the oxides of selenium, such as, selenium dioxide and selenium trioxide, and the selenium compounds of selenium tetrachloride ($SeCl_4$), selenium tetrafluoride ($SeF_4$), selenium oxybromide ($SeOBr_2$), selenium oxydichloride ($SeOCl_2$), selenium disulfide ($SeS_2$), selenium hexasulfide ($Se_2S_6$), selenoyl fluoride ($SeO_2F_2$), and selenium monochloride ($Se_2Cl_2$). The preferred selenium compound for use in preparing the inventive composition and providing for the selenium component of the inventive composition is either selenous acid or selenic acid, and, among these, selenous acid is the more preferred.

In one embodiment of the invention, a support particle, comprising an inorganic refractory oxide, such as, for example, alumina, is first prepared and then followed by incorporation of the selenium compound into the support particle. The support particle of the catalyst composition is, typically, in the form of an agglomerate or a shaped particle. The support material, thus, is formed into a particle or shape by any of the suitable means or methods known to those skilled in the art.

Typically, in the preparation of a shaped support, the porous refractory oxide starting material is in the form of a powder and is mixed with water, and, if desired or necessary, other chemical aids such as peptizing agents or flocculating agents or binders or other compounds, to form a mixture, which may be an extrudable paste, that is formed into an agglomerate or shaped particle. It particularly can be desirable to extrude the mixture that is in the form of an extrudable paste to make extrudates of any one or more of various shapes such as cylinders, trilobes, quadralobes, and etc. having nominal sizes such as 1/16 inch, 1/8 inch, 3/16 inch, and etc.

The agglomerate or shaped particle that comprises one or more of the previously listed inorganic oxide compounds is then dried to give a dried shaped support particle that is used in the preparation of the inventive catalyst composition. Drying of the shaped support particle is carried out under standard drying conditions that can include a drying temperature in the range of from 50° C. to 200° C., preferably, from 75° C. to 175° C., and, more preferably, from 90° C. to 150° C. Typically, this drying step is done in the presence of oxygen or an oxygen-containing gas air.

The dried support particle typically will include upwardly to 100 weight percent, on a dry basis, inorganic refractory oxide. Generally, the amount of inorganic refractory oxide of the dried support particle is in the range of from 80 wt. % to 100 wt. %, and, more typically the inorganic refractory oxide is present in an amount in the range of from 90 wt. % to 100 wt. %.

In a preferred embodiment of the invention, the support particle, which may be in the form of a shaped particle, e.g., an extrudate, a sphere, a pill, etc., is dried, but not calcined, prior to the incorporation of the selenium compound or component into the support particle. It is believed that the incorporation of the selenium compound or component into the dried-only support particle, prior to its calcination, ultimately provides for a final hydroprocessing catalyst composition of the invention that has certain enhanced properties over those of a hydroprocessing catalyst composition made by utilizing a support particle that has been calcined prior to incorporation therein of the selenium component.

While not wanting to be bound to any particular theory, it is thought that by incorporating the selenium into the uncalcined shaped support particle followed by calcination of the selenium-containing support, the selenium participates in some important but unknown way in the chemical transformation that takes place when the inorganic refractory oxide changes its crystalline form due to the high temperature calcination. An example of such a transformation is when an inorganic refractory oxide such as alumina changes from the pseudo boehmite form that it is predominantly in before calcination treatment to the gamma form upon calcination treatment.

Thus, in one embodiment of the invention, the support particle, comprising a porous refractory oxide, before the incorporation therein of the selenium compound, may undergo a drying treatment, but not a calcination treatment, to provide a dried-only selenium-containing support particle. Therefore, the drying treatment of the support particle is carried out at a drying temperature that is less than a calcination temperature. In this case, the drying temperature should not exceed 350° C., and, preferably, the drying temperature at which the support particle is dried does not exceed 300° C., and, most preferably, the drying temperature does not exceed 250° C.

After the selenium compound is incorporated into the dried-only support particle, the resulting selenium-containing support is then calcined under standard calcination conditions that include a calcination temperature in the range of from 250° C. to 900° C., preferably, from 300° C. to 800° C., and, most preferably, from 350° C. to 600° C. This calcination step provides a calcined selenium-containing support (calcined support).

The calcined selenium-containing support particle comprises, consists essentially of, or consists of an inorganic refractory oxide, which is preferably alumina, and a selenium component. It is desirable for the selenium component to be present in the calcined support particle at a concentration in the range of from an effective concentration upwardly to or about 3 weight percent (wt. %) based on the dry weight of the inorganic refractory oxide of the calcined support particle and calculated based on the selenium as the element.

It is noted that a small concentration of selenium in the calcined support can provide for a final hydrotreating catalyst composition that has significantly enhanced hydrotreating catalytic activity when compared against similar hydrotreating catalysts made with a calcined support that has no material or effective concentration of selenium. It further has been discovered that incremental increases in the selenium concentration of the calcined support are attributable to incremental increases in catalytic activity of the final hydroprocessing catalyst composition but that there is an optimum in the improvement in catalytic activity. Therefore, there is a maximum selenium concentration of the calcined support at which point there is no more observed incremental improvement in the catalyst activity with incremental increases in the selenium concentration. From this maximum selenium concentration level, incremental increases in the selenium concentration in the calcined support tend to result in incremental decreases in catalytic activity until the catalyst activity becomes the same as or less than the activity of the comparative catalyst which uses a calcined support that contains no material concentration of selenium.

It is, thus, generally desirable for the selenium component of the calcined support, i.e., the calcined selenium-containing support which comprises, consists essentially of, or consists of an inorganic refractory oxide and a selenium component, to be present therein at a material or effective concentration that typically can be in the range of from or about 0.01 wt. % to or about 2.95 wt. %, based on the dry weight of the inorganic refractory oxide of the calcined support particle and calculated based on the selenium as the element, regardless of its actual form. A preferred selenium concentration within the calcined support is in the range of from or about 0.05 wt. % to or about 2.85 wt. %, and, a more preferred selenium concentration is in the range of from 0.075 wt. % to 2.75 wt. %.

It is also a preferred feature of the inventive catalyst composition for the selenium component to be an underbedded selenium component. What is meant when referring herein to an underbedded selenium component is that the selenium is incorporated into the porous inorganic refractory oxide material of the support particle that is thereafter calcined, under conditions described herein, to provide the calcined selenium-containing support onto which at least one hydrogenation metal component is introduced as an overlayer of hydrogenation metal. This metal-incorporated, selenium-containing support is then calcined under suitable calcination conditions, as described herein, to provide the inventive catalyst composition having an underbedded selenium component with an overlayer of at least one hydrogenation metal component.

To prepare the hydroprocessing catalyst of the invention, at least one hydrogenation metal component is incorporated as a metal overlayer into the calcined selenium-containing support particle. The hydrogenation metal may be incorporated into the calcined support particle, comprising an inorganic refractory oxide and a selenium component, by any suitable means or method known to those skilled in the art, but the preferred method of incorporation is by any of the well known pore fill impregnation procedures.

The calcined support particle therefore is impregnated by one or more impregnation steps with at least one hydrogenation metal component using one or more aqueous solutions containing at least one metal salt wherein the metal compound of the metal salt solution is an active metal or active metal precursor. The metal elements are those selected from Group VI of the Periodic Table of the elements (e.g., chromium (Cr), molybdenum (Mo), and tungsten (W)) and Group VIII of the Periodic Table of the elements (e.g., cobalt (Co) and nickel (Ni)). Phosphorous (P) may also be a desired metal component.

For the Group VIII metals, the metal salts include Group VIII metal acetates, formats, citrates, oxides, hydroxides, carbonates, nitrates, sulfates, and two or more thereof. The preferred metal salts are metal nitrates, for example, such as nitrates of nickel or cobalt, or both.

For the Group VI metals, the metal salts include Group VI metal oxides or sulfides. Preferred are salts containing the Group VI metal and ammonium ion, such as ammonium heptamolybdate and ammonium dimolybdate.

The phosphorus compounds that may be used include the acids of phosphorus, such as meta-phosphoric acid, pyrophosphoric acid, and phosphorous acid. The preferred phosphorus compound is orthophosphoric acid ($H_3PO_4$), or a precursor of an acid of phosphorus, i.e., a phosphorus-containing compound capable of forming a compound containing at least one acidic hydrogen atom when in the presence of water, such as phosphorus oxide, phosphorus, or the like.

The concentration of the metal compounds in the impregnation solution (metal-containing impregnation solution) is selected so as to provide the desired metal content in the final hydroprocessing catalyst composition of the invention taking into consideration the pore volume of the calcined support into which the aqueous solution is impregnated. Typically, the concentration of metal compound in the impregnation solution is in the range of from 0.01 to 100 moles per liter.

The amount of metal incorporated into the calcined selenium-containing support to provide a metal-impregnated, selenium containing support may depend upon the application in which the composition of the invention is to be used, but, generally, for the hydroprocessing applications contemplated herein, the Group VIII metal component, i.e., cobalt or nickel, preferably, nickel, can be present in the final hydroprocessing catalyst in an amount in the range of from 0.5 wt. % to 20 wt. %, preferably from 1 wt. % to 15 wt. %, and, most preferably, from 1.5 wt. % to 12 wt. %.

The Group VI metal component, i.e., molybdenum or tungsten, preferably, molybdenum, can be incorporated into the calcined selenium-containing support in an amount such that final hydroprocessing catalyst has a concentration of Group VI metal component in the range of from 5 wt. % to 50 wt. %, preferably from 7.5 wt. % to 40 wt. %, and, most preferably, from 10 wt. % to 30 wt. %.

When the final hydroprocessing catalyst contains a concentration of phosphorus, the amount of the phosphorus component that is incorporated into the calcined selenium-containing support is such that the final hydroprocessing catalyst has a phosphorus content in the range of upwardly to or about 5 wt. %, and, typically, from 0.1 wt. % to 5 wt. %. The preferred concentration of the phosphorus component of the hydroprocessing catalyst is in the range of from or about 0.3 wt. % to or about 4 wt. %, and, more preferably, the range is from 0.5 wt. % to 3 wt. %.

The above-referenced weight percents for the metal components and phosphorus are based on the weight of the total dry weight of the hydroprocessing catalyst and the metal and phosphorus, if present, components being in an oxide form regardless of their actual form, e.g., the oxide form or sulfide form or elemental form, of the metal component.

In the preparation of the catalyst composition of the invention, the metal-containing impregnation solution may be an aqueous solution comprising at least one metal, as described above, having a hydrogenation function, and the aqueous solution may further, optionally, comprise phosphorus. The at least one metal of the metal-containing impregnation solution may include, for example, a metal selected from the group consisting of nickel, cobalt, molybdenum, tungsten and any combination of two or more thereof. The metal component and, optionally, the phosphorus component, is incorporated into the calcined support to thereby provide a metal-incorporated, selenium-containing support, or an impregnated support.

The incorporation of the metal-containing impregnation solution into the calcined support may be done by any suitable means or method known to those skilled in the art. One such method may include standard impregnation by incipient wetness or even soaking the calcined support with an excess amount of the metal-containing impregnation solution than would otherwise be used in a dry impregnation or an incipient wetness impregnation. The metal-incorporated support undergoes a drying step under drying conditions as detailed earlier herein.

After the metal is incorporated into the calcined selenium-containing support, the resulting metal-incorporated, selenium-containing support or impregnated support is dried and then calcined under standard calcination conditions that include a calcination temperature in the range of from 250° C. to 900° C., preferably, from 300° C. to 800° C., and, most preferably, from 350° C. to 600° C. The calcination is typically conducted in an air or oxygen atmosphere. This calcination step provides the final hydroprocessing catalyst of the invention.

In hydrotreating applications, the inventive hydroprocessing catalyst is contacted under suitable hydrodesulfurization conditions with a hydrocarbon feedstock that typically has a concentration of sulfur.

The more typical and preferred hydrocarbon feedstock is a petroleum middle distillate cut having a boiling temperature at atmospheric pressure in the range of from or about 140° C. (284° F.) to or about 410° C. (770° F.). These temperatures are approximate initial and boiling temperatures of the middle distillate.

Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw).

It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The hydroprocessing catalyst composition of the invention may be employed as a part of any suitable reactor system that provides for contacting it or its derivatives with the distillate feedstock under suitable hydrodesulfurization conditions that may include the presence of hydrogen and an elevated total pressure and temperature.

Such suitable reaction systems can include fixed catalyst bed systems, ebullating catalyst bed systems, slurried catalyst systems, and fluidized catalyst bed systems. The preferred reactor system is that which includes a fixed bed of the inventive hydroprocessing catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

The flow rate at which the distillate feedstock is charged to the reaction zone of the inventive process is generally such as to provide a liquid hourly space velocity (LHSV) in the range of from 0.01 hr$^{-1}$ to 10 hr$^{-1}$.

The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged.

The preferred LHSV is in the range of from 0.05 hr$^{-1}$ to 5 hr$^{-1}$, more preferably, from 0.1 hr$^{-1}$ to 3 hr$^{-1}$ and, most preferably, from 0.2 hr$^{-1}$ to 2 hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 36 m$^3$/m$^3$ (200 SCF/bbl) to 1781 m$^3$/m$^3$ (10,000 SCF/bbl), more preferably, from 44 m$^3$/m$^3$ (250 SCF/bbl) to 1602 m$^3$/m$^3$ (9,000 SCF/bbl), and, most preferably, from 53 m$^3$/m$^3$ (300 SCF/bbl) to 1425 m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following examples are presented to further illustrate the invention, but they are not to be construed as limiting the scope of the invention.

EXAMPLE I

Selenium Doped Support

This Example I describes the preparation of each of the supports used in the preparation of the inventive and comparative compositions. The various embodiments of the inventive compositions described in these examples include the use of an alumina support that contains a concentration of selenium.

An alumina extrudate was prepared by mulling a wide pore alumina powder with from 1 to 3.5 wt % nitric acid and enough water to produce a final mixture having an loss on ignition (LOI) value in the range of from 58 to 62 wt %. The mulling of the components was for a time period of from about 15 to 20 minutes. The final mixture was extruded into a 1.3 mm trilobe shape and pellets of a length of around 5 mm. These extrudates were then dried at a temperature of 125° C. (257° F.) for about 3 to 4 hours. The dried extrudates were not calcined before the incorporation of the selenium component as described below.

The dried-only, uncalcined alumina extrudate was pore-fill impregnated with an aqueous solution of selenous acid ($H_2SeO_3$). The selenous acid solution was prepared by dissolving selenous acid in water with heating to 88° C. (190° F.).

After the impregnation of the extrudate, the selenium-impregnated extrudate was dried at a temperature of 125° C. (257° F.) for 2 hours and then calcined in air at 482° C. (900° F.) for 1 hour to provide a calcined selenium-containing extrudate.

Four different supports were used in the preparation of the final catalyst compositions described in Examples II and III. The support used in the preparation of the base or comparison compositions contained no selenium as a dopant. The other three supports were each impregnated with a different concentration levels of selenium. The following Table 1 presents the amounts of selenium used in the preparation of each of the four supports by weight parts $H_2SeO_3$ per 100 weight parts of dried-only, uncalcined alumina extrudate.

TABLE 1

| Selenium levels in each support | |
|---|---|
| Support | Wt. $H_2SeO_3$ per 100 wt dried only alumina extrudate |
| A | 0 |
| B | 0.442 |
| C | 2.19 |
| D | 4.37 |

EXAMPLE II

Catalyst Composition

This Example II describes the preparation of catalyst compositions using an acid side prepared metals impregnation solution to impregnate the selenium-containing supports of Example I.

To prepare the metals impregnation solution, a first solution was made in a first beaker by introducing into the first beaker 7.11 g of water followed by 6.15 g of ammonium dimolybdate (57.5% Mo) and 3.45 g of molybdenum oxide (62.5% Mo) while stirring. Next, 1.49 g of 30% hydrogen peroxide was added to the contents of the first beaker followed by the slow addition of 0.85 g monoethanol amine while keeping the temperature of the mixture below 60° C. (140° F.). The mixture was maintained at a temperature in the range of from 49-60° C. (120-140° F.) with stirring until clear solution was formed. Afterwards, the clear solution was cooled to room temperature.

A second solution was prepared by placing into a second beaker 1.58 g water, 3.07 g 86.8% $H_3PO_4$ and 3.95 g nickel nitrate (20.19% Ni). This mixture was heated to a temperature of 32° C. (90° F.) while being stirred. 1.32 g $NiCO_3$ (40.24% Ni) was added to this mixture slowly, in order to control the foaming, and the resulting mixture was heated to 35° C. (95° F.) until it was clear. The clear solution was then cooled.

The first solution and the second solution were mixed together and the volume of the mixture of two solutions was adjusted to 24.2 ml with the addition of water.

To impregnate the selenium doped supports of Example I, 30 g of the relevant selenium-containing extrudate (i.e., A, B, C and D) was placed into a polyethylene container (bottle) with an appropriate amount of the metal impregnation solution that is described above in this Example II. The bottle was then capped and gently shaken to aid in the impregnation. The metals-impregnated, selenium-containing support was aged for at least 2 hrs, dried for 3 hrs at 125° C., and then calcined at 482° C. (900° F.) for 1 hr. The resulting catalyst composition contained 13.5 wt % Mo, 3.15 wt % Ni, and 2 wt % P. The following Table 2 presents the weight percent selenium in each of the four catalyst compositions prepared by the method described in this Example II.

TABLE 2

| Selenium concentration of each catalyst composition | |
|---|---|
| Support-Catalyst | Weight Percent Selenium |
| A-1 | 0 |
| B-2 | 0.23 |
| C-3 | 1.1 |
| D-4 | 2.15 |

EXAMPLE III

Catalyst Composition

This Example III describes the preparation of catalyst compositions using a standard prepared metals impregnation solution to impregnate the selenium-doped supports of Example I.

To prepare the metals impregnation solution, 24.7 g of water was introduced into a beaker followed by the addition of 3.36 g of 86.8% phosphoric acid, 9.817 g of molybdenum oxide (62.5% Mo), and 3.001 g of nickel hydroxide (58% Ni) while the beaker contents were stirred. The mixture was heated to 190° F. held until there was a clear solution. The solution was then cooled to room temperature, and the volume was adjusted to 24.2 ml by the addition of water.

To impregnate the selenium doped support of Example 1, 30 g of the relevant selenium-containing extrudate was placed into a polyethylene container (bottle) with an appropriate amount of the metals impregnation solution described above in this Example III. The bottle was then capped and gently shaken to aid in the impregnation. The metals-impregnated, selenium-containing support was aged for at least 2 hrs, dried for 3 hrs at 125° C., and then calcined at 482° C. (900° F.) for 1 hr. The resulting catalyst composition contained 14.1 wt % Mo, 4 wt % Ni and 2.1 wt % P. The following Table presents the weight percent selenium in each of the four catalyst compositions prepared by the method described in this Example III.

TABLE 3

Selenium concentration of each catalyst composition

| Support-Catalyst | Weight Percent Selenium |
|---|---|
| A-5 | 0 |
| B-6 | 0.22 |
| C-7 | 1.06 |
| D-8 | 2.08 |

EXAMPLE IV

Catalyst Activity Testing

This Example IV describes the hydrodesulfurization activity testing of each of the six selenium containing catalysts (Catalysts B2, C3, D4, B6, C7, and D8) and the two comparison catalysts (Catalysts A1 and A5). Activity test data is also presented.

Each of the batch reactors were loaded with 80 mg of one of the eight catalysts. The catalysts were then sulfided by pressurizing the reactors with a 5% $H_2S$/95% hydrogen gas to 300 psi followed by raising the reactor temperature to 350° C. A gas flow rate of 120 cc/min and reactor temperature of 350° C. were maintained for 3 hrs. The reactors were then cooled to room temperature and purged with nitrogen gas.

After the sulfiding of the catalysts, the reactors each were then loaded with 3.95 g of distillate feed on top of the sulfided catalysts and re-pressurized with 100% hydrogen gas to 300 psi. The reactor temperature was raised to 340° C. and held constant for 2 hours while maintaining during this time a gas flow rate 100 cc/min. The reactors were then cooled to room temperature and the remaining sulfur concentrations in the feeds were tested. The remaining sulfur concentrations of the feeds were used to calculate the catalyst activities per milligram. The performance of each catalyst was then normalized to that of a commercially available hydrodesulfurization catalyst. The resulting measured catalyst activities of the eight tested catalysts are expressed as relative weight activity (RWA) versus commercial catalyst and are presented in the following Tables 4 and 5.

TABLE 4

Selenium concentration of each catalyst composition

| Support-Catalyst | Weight Percent Selenium | RWA |
|---|---|---|
| A-1 | 0 | 1.25 |
| B-2 | 0.23 | 2.1 |
| C-3 | 1.1 | 1.8 |
| D-4 | 2.15 | 1.5 |

TABLE 5

Selenium concentration of each catalyst composition

| Support-Catalyst | Weight Percent Selenium | RWA |
|---|---|---|
| A-5 | 0 | 1.3 |
| B-6 | 0.22 | 1.58 |
| C-7 | 1.06 | 1.75 |
| D-8 | 2.08 | 1.2 |

As may be observed from an examination of the relative hydrodesulfurization activity values that are presented in Tables 4 and 5, the catalyst compositions prepared using a selenium-doped alumina support that has a small but material concentration of a selenium component show a significant increase in their relative weight activity (RWA) for the desulfurization of a distillate feedstock compared to the RWA of the catalyst composition using the support containing no selenium. Presented in FIG. 1 are plots of the data contained in Tables 4 and 5. It appears from the data presented that the RWA of the catalyst continues to improve as the selenium concentration of the selenium-doped alumina support increases from zero and then the RWA reaches a maximum improvement. At this point, the RWA of the catalyst declines with further increases in the selenium concentration of the selenium-doped support until there is, instead of an improved activity, a worst catalytic performance than that of the catalyst that uses a support containing no selenium. Thus, there appears to be an optimum selenium concentration in the doped support that provides for enhanced catalytic activity.

That which is claimed is:

1. A method of making a hydroprocessing catalyst, wherein said method comprises:
   preparing a support particle, comprising an inorganic refractory oxide;
   incorporating a selenium compound into said support particle to provide a selenium-containing support;
   calcining said selenium-containing support to provide a calcined selenium-containing support, comprising said inorganic refractory oxide and a selenium component;
   incorporating a hydrogenation metal into said calcined selenium-containing support to provide a metal-incorporated, selenium-containing support, comprising said inorganic refractory oxide and a selenium component; and
   calcining said metal-incorporated, selenium-containing support to provide said hydroprocessing catalyst,
   wherein said hydroprocessing catalyst includes a concentration of said Group VIII metal component in said hydroprocessing catalyst in the range of from 0.5 wt. % to 20 wt. % based on the total weight of said hydroprocessing catalyst and calculated based on the Group VIII metal component as an oxide, and wherein said hydroprocessing catalyst includes a concentration of said Group VI metal component in said hydroprocessing catalyst in the range of from 5 wt. % to 50 wt. % based on the total weight of said hydroprocessing catalyst and calculated based on the Group VI metal component as an oxide.

2. A method as recited in claim 1, wherein said support particle is uncalcined prior to said incorporating of said selenium compound into said support particle.

3. A method as recited in claim 2, wherein said calcined selenium-containing support has a concentration of a selenium component therein in the range upwardly to 3 weight percent based on the dry weight of said inorganic refractory oxide and calculated based on said selenium component as the element.

4. A method as recited in claim 3, wherein said hydrogenation metal comprises at least on hydrogenation metal component that includes a Group VIII metal component of either a nickel component or a cobalt component and a Group VI metal component of either a molybdenum component or a tungsten component.

5. A composition prepared by any one of the methods of claims 1 through 4.

6. A method as recited in claim 4, wherein said calcining of said selenium-containing support to provide said calcined selenium-containing support is conducted at a first calcination temperature in the range of from 250° C. to 900° C.

7. A method as recited in claim 6, wherein said calcining of said metal-incorporated, selenium-containing support is conducted at a second calcination temperature in the range of from in the range of from 250° C. to 900° C.

8. A method as recited in claim 7, wherein said concentration of said selenium component is in the range of from 0.075 wt. % to 2.75 wt. %, said concentration of said Group VIII metal component is in the range of from 1.5 wt. % to 12 wt. %, and said concentration of said Group VI metal component is in the range of from 10 wt. % to 30 wt. %.

9. A method as recited in claim 1, wherein said calcining of said selenium-containing support to provide said calcined selenium-containing support is conducted at a first calcination temperature in the range of from 250° C. to 900° C., and wherein said calcining of said metal-incorporated, selenium-containing support is conducted at a second calcination temperature in the range of from in the range of from 250° C. to 900° C.

10. A method as recited in claim 9, wherein said concentration of said selenium component is in the range of from 0.075 wt. % to 2.75 wt. %, said concentration of said Group VIII metal component is in the range of from 1.5 wt. % to 12 wt. %, and said concentration of said Group VI metal component is in the range of from 10 wt. % to 30 wt. %.

* * * * *